(No Model.)

J. G. MOOMY.
PNEUMATIC TIRE.

No. 554,711.          Patented Feb. 18, 1896.

WITNESSES:

INVENTOR
Joseph G. Moomy
BY Hallock & Lord
ATTORNEYS

UNITED STATES PATENT OFFICE.

JOSEPH G. MOOMY, OF ERIE, PENNSYLVANIA.

PNEUMATIC TIRE.

SPECIFICATION forming part of Letters Patent No. 554,711, dated February 18, 1896.

Application filed October 26, 1895. Serial No. 566,956. (No model.)

*To all whom it may concern:*

Be it known that I, JOSEPH G. MOOMY, a citizen of the United States, residing at Erie, in the county of Erie and State of Pennsylvania, have invented certain new and useful Improvements in Pneumatic Tires; and I do hereby declare the following to be a full, clear, and exact description of the invention, such as will enable others skilled in the art to which it appertains to make and use the same.

This invention relates to pneumatic tires, particularly the inner tubes thereof; and it consists in certain improvements in their construction as will be hereinafter fully described and pointed out in the claims.

Figure 1:
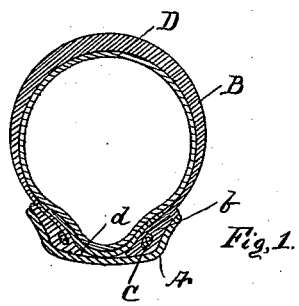
Figure 2:
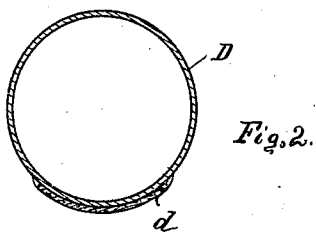
Figure 3:
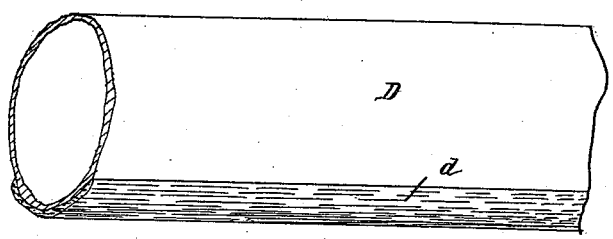

The invention is illustrated in the accompanying drawings as follows:

Figure 1 shows a transverse section of a tire and rim with my improved tube in place within the tire. Fig. 2 shows a transverse section of the tube. Fig. 3 shows a side elevation of a fragment of the tube.

A marks the wheel-rim, B a tire thereon open on its inner periphery and provided with an annular binder-flap $b$, and C the binder upon said flap for securing the tire to the rim. An air-tube D is placed within the tire. This tube D has a reinforcement $d$ on its inner periphery of fiber-stock. This fiber-stock is formed by mixing a fiber, as cotton fiber, with the rubber. The fiber and rubber are preferably calendered in one direction so as to bring the fibers substantially to one general direction. It is then placed on the tube with the fiber in a longitudinal direction and the tube and fiber-stock vulcanized together.

It has been found difficult to secure tires, similar to the one shown, to the wheel-rims with an ordinary wholly elastic tube. To obviate this an all-fiber-stock tube has been used, but it has been found that such a tube interferes to some extent with the resiliency of the tire. I have discovered that by reinforcing the tube on the inner periphery only the tire can be readily secured to the rim, and the outer periphery of the tube having the natural elasticity of the rubber the resiliency of the tire is not affected. I have found that such a reinforcement also aids materially in getting the tube into position. This is particularly true where the tube is used with that class of tires into which the tube is drawn endwise. The reinforcement is also desirable as strengthening the inner portion of the tube, so as to make it more effective in resisting tears and punctures incident to rough handling and contact with the rim. The fiber-stock makes such a reinforcement practical, as where cloth is used the change in elasticity from the outer rubber portion is so abrupt that the rubber tears, with use, along the edge of the reinforced portion. The use of the fiber-stock reinforcement secures all the results desired without producing the tendency to tear at the edge.

What I claim as new is—

1. As an article of manufacture a tube, for pneumatic tires having its outer periphery formed of rubber of natural elasticity and its inner periphery with fiber-stock.

2. As an article of manufacture a tube for pneumatic tires having its outer periphery formed of rubber of natural elasticity and its inner periphery with fiber-stock, the fiber of which has a general longitudinal direction.

3. In a pneumatic tire the combination with the outer cover thereof open on its inner periphery; the rim; and a binder for binding the edges of the cover to the rim; of a tube having its outer periphery formed of rubber of natural elasticity and its inner periphery with fiber-stock.

In testimony whereof I affix my signature in presence of two witnesses.

JOSEPH G. MOOMY.

Witnesses:
WM. MARKS, Jr.,
HENRY E. FISH.